Figure 1:
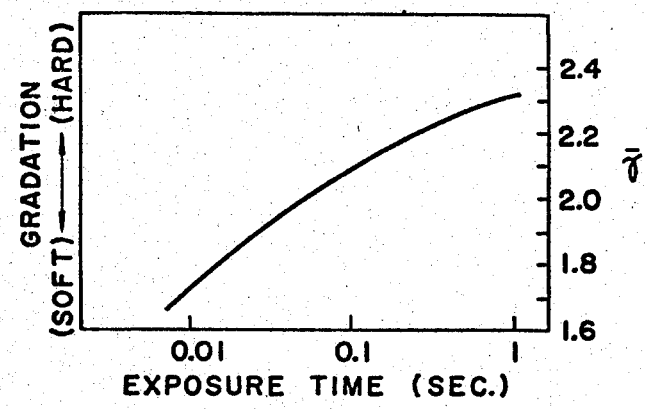

United States Patent [19]
Fujimura

[11] 3,854,816
[45] Dec. 17, 1974

[54] PHOTOGRAPHIC PRINTING APPARATUS

[75] Inventor: Ikuo Fujimura, Minamiashigara-machi, Japan

[73] Assignee: Fuji Shashin Film Kabushiki, Minamiaskigara-machi, Ashigarakami-gun, Kanagawa-ken, Japan

[22] Filed: Jan. 29, 1973

[21] Appl. No.: 327,398

Related U.S. Application Data

[60] Continuation-in-part of Ser. No. 128,487, March 26, 1971, , which is a division of Ser. No. 887,281, Dec. 22, 1969, , which is a continuation-in-part of Ser. No. 446,032, April 6, 1965.

[52] U.S. Cl. .................................................. 355/71
[51] Int. Cl. .......................................... G03b 27/76
[58] Field of Search .............................. 355/68–71, 355/83; 356/175, 178

[56] References Cited
UNITED STATES PATENTS 3,096,176 7/1963 Craig ............................... 355/68 X
3,205,767 9/1965 Weber et al. ..................... 355/71 X Primary Examiner—Richard A. Wintercorn
Attorney, Agent, or Firm—Bucknam & Archer

[57] ABSTRACT

An apparatus for producing a photographic image and producing the desired gradation, comprises a light source of high intensity, at least one shutter for varying the exposure time and means for controlling the intensity of the light inversely proportionally to the exposure time. The apparatus may comprise, for instance, three shutters which are adapted for exposure time of 0.01 second, 0.1 second and 1 second respectively. The shutters are rotatable disks with fan-shaped apertures, provided with filters of different density, the exposure time being controlled by the degree of the angle of the apertures.

8 Claims, 8 Drawing Figures

3,854,816

PHOTOGRAPHIC PRINTING APPARATUS

This application is a Continuation-in-part of Ser. No. 128,487 filed Mar. 26, 1971, which was a Divisional of Ser. No. 887,281 filed Dec. 22, 1969. The latter was a Continuation-in-part of Ser. No. 446,032, filed Apr. 6, 1965.

The present invention relates to an apparatus for carrying out a photographic printing process. More particularly, the invention relates to an improved photographic printing apparatus for varying the gradation of an image developed on a photographic light-sensitive material by the selection of particular exposure conditions.

That is, the invention is an improved photographic printing apparatus in which the gradation of a printing paper can be desirably changed. The accompanying drawing shows the relationship between the exposure time of a photographic printing paper at printing and the gradation, when a printing paper is exposed for a short duration of time at printing. The gradation of the printing paper is softened and when the printing paper is exposed for a long duration of time, the gradation is returned to the usual gradation. Namely, in the use of this invention, by controlling the intensity of a printing light in inversely proportion to the exposure time and adjusting the whole intensity of radiation at exposure, the gradation of the printing paper can be desirably changed. Printing papers employed in the practice of the invention are those conventionally used, i.e. those containing silver halide (AgX) for enlargement.

Hitherto, in order to carry out printing procedure successfully from negatives having various gradations onto positive light sensitive material, many grades of positive light sensitive material having hardness numbers of, for example, from No. 1 to No. 5 in increasing hardness or developing solutions suitable for various gradations must be prepared. Further, the gradation, the color tone, the maximum density and even the sensitivity of different brands of positive light-sensitive materials of the same hardness number differ so that it is difficult to determine the appropriate exposure level for favorable printing, and hence skilled workers are required to determine the same. Moreover, in the case of using such a conventional process, there are drawbacks that when such developing is carried out automatically, the equipment necessary for carrying out the development are complicated and very large, which makes such automation very costly.

However, according to this invention various gradations can be obtained from one kind of printing paper and hence only one kind of printing paper or developing solution can meet this requirement. Therefore, the color tone and the highest density are not influenced by the change of gradation, the exposure level can be determined since the sensitivity is changed systematically according to the duration of exposure time and the intensity of radiation at exposure. With the present invention, printing and development can be easily carried out automatically and with a low cost.

Further, if this invention is applied for the case of negative-positive type color printing, the whole gradation of color balance of color prints can be controlled in a broad range.

Figure 2:
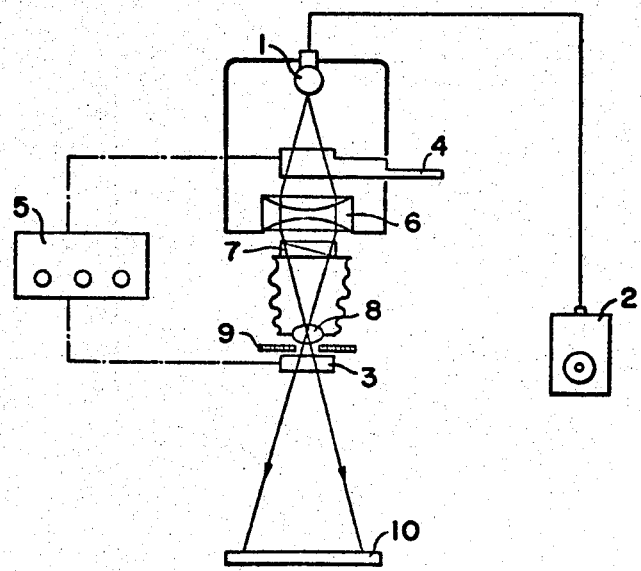

For a better understanding of the invention and to show how the same may be carried into effect, reference will now be made, by way of example, to the accompanying drawing, in which:

FIG. 1 shows a graph illustrating the variation in gradation of an image developed on a photographic positive light-sensitive material, and FIG. 2 an apparatus for carrying out the process of the invention.

Figure 3:
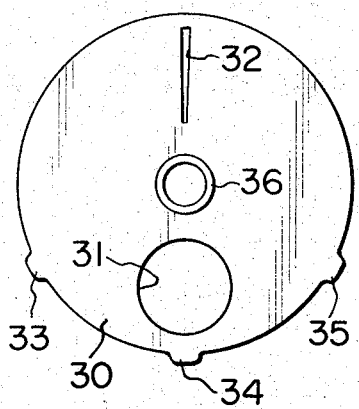
Figure 4:
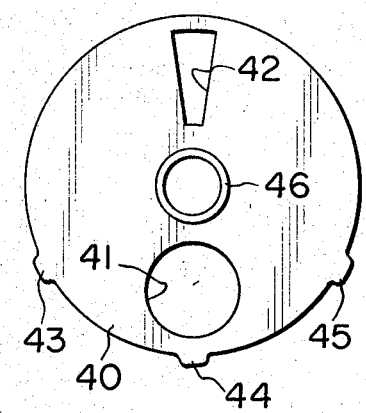
Figure 5:
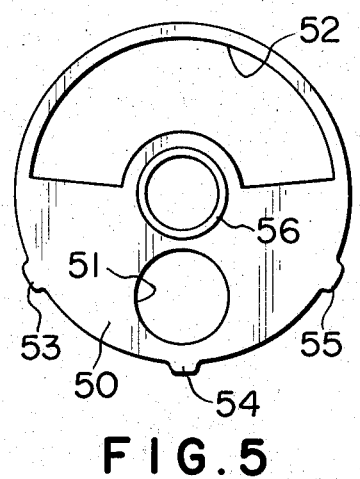
Figure 6:
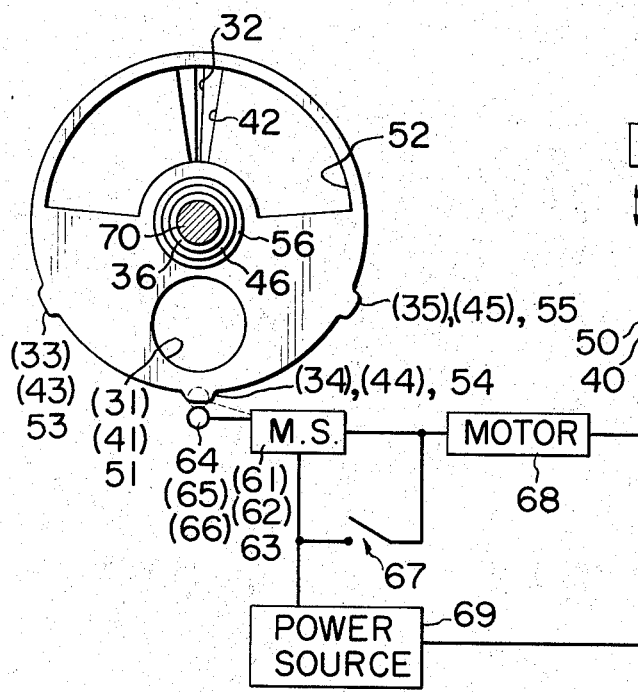
Figure 7:
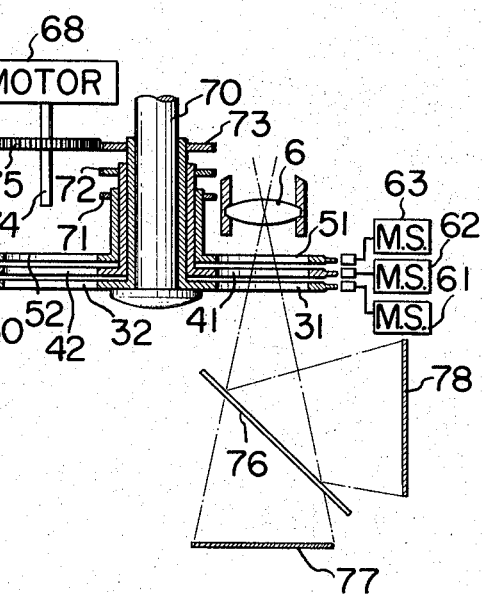
Figure 8:
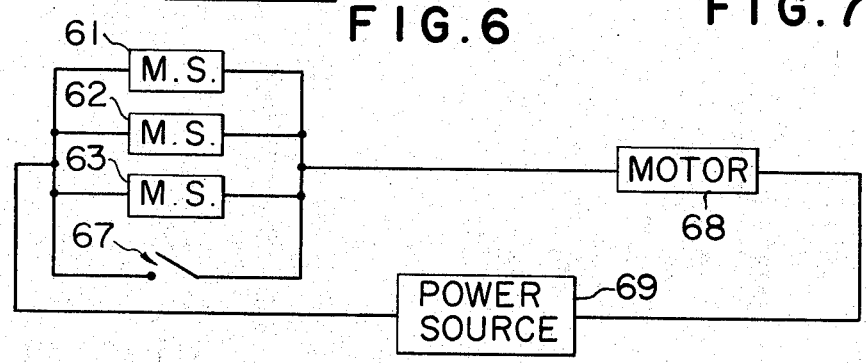

FIGS. 3, 4 and 5 are plane figures showing three shutters with different openings, for exposure time of 0.01 second, 0.1 and 1 second respectively. FIG. 6 illustrates the microswitches 61, 62 and 63. FIG. 7 illustrates the three shutters 30, 40 and 50 with holes 31, 41 and 51 coinciding with each other. FIG. 8 illustrates the circuit comprising the motor 68 which drives the shutters.

Referring now to the drawing, the graph of FIG. 1 shows the variation in gradation of an image developed on a photographic harder grade print paper for enlargement, by developing treatment accompanied by a change of the exposure time. The ordinate represents the gradation expressed by value of $\bar{\gamma}$, where $\bar{\gamma}$ is the measure of the average slope of the curve, the low values thereof being equivalent to the use of a soft paper, and the abscissa represents the exposure time in seconds. The present invention utilizes the phenomenon that, as can be seen from FIG. 1, when an extremely short exposure is used as compared with the usual exposure time, the gradation of the image developed is softened, whilst when a longer exposure time is used the gradation is approximately that normally obtained.

In FIG. 2, the photographic printing apparatus is shown. As shown therein, a light source 1 is one a high intensity sufficient for printing papers by a short duration of exposure, e.g., by an exposure of 0.01 second, and for the purpose, a high-pressure mercury lamp is suitable. An electric power course 2 is connected to the light source 1. The numeral 3 represents a shutter capable of changing exposure time and the numeral 4 represents a control wedge for controlling the intensity of light to a negative film 7 in inversely proportion to exposure time and is connected to a gradation selector 5 electrically or mechanically. That is, by operating the gradation selector 5, the shutter 3 is set a desired exposure time (that is, a desired gradation) and at the same time the control wedge is set to light intensity corresponding to the exposure time. Furthermore, in the case where a short exposure is needed in spite of requiring a large amount of light in accordance with the tone of a negative film or in the case contrary to the above case, an exposure control iris 9 for controlling the amount of light passing through a lens 8 is placed. In addition, the numeral 6 represents a condensor lens and the numeral 10 represents a printing paper.

By using the gradation selector 5 which can electrically and/or mechanically control the combination of the exposure time, varied by means of the electric power source 2, and the intensity of light passing through the wedge 4, it is possible to dispense with the shutter 3, if so desired.

The gradation selector is used for varying the exposure time and the intensity of the light in combination, for example by varying the opening time of the shutter 3 and the intensity of the light passing through the wedge 4 in combination, or by varying the light up duration of the light source 1 and the intensity of the light passing through the wedge 4 in combination. The product of the exposure time and the intensity of the light is normally kept constant, with the exposure control iris controlling the printing intensity, that is, the total amount of light in an exposure. However, when a wedge filter is used instead of the exposure control iris to vary the total amount of light in an exposure, it is possible to control the total amount of light in an exposure as well as the intensity of the light in combination with the exposure time.

Using the apparatus of this invention, the gradation of an image developed on a positive printing paper having a hardness No. 4 using an exposure time of about 0.01 second was softened to a gradation corresponding to a hardness number of No. 2, while the said positive printing paper developed an image of the original gradation of No. 4 when an exposure of 1 second was used. Accordingly, by using a positive printing paper having a hardness number of No. 4, it is possible to effectively vary the gradation between 4 and 2 without having to use printing papers of from 4 to 2 or vary the developers. Thus, when a printing paper is exposed for a short duration of time at printing, the gradation of the printing paper is softened and when the printing paper is exposed for a long duration of time, the gradation is returned to the usual gradation.

According to the photographic printing apparatus of the present invention as described above, by using only one kind of positive light-sensitive material, it is possible to produce an image of favorable gradation from a negative of various gradations and an image of various gradations from a negative. The color tone (based on the spectral reflection of developed Ag) and the maximum density of such images are not influenced by the variations in gradation because both the positive light-sensitive material and the developing solution used are not varied. The exposure level can be easily determined since the sensitivity is varied systematically and automatic printing and development is relatively easy technologically and may be attained with relatively low cost.

With reference to FIGS. 3, 4 and 5, the shutters are opaque circular disks of same diameters having round openings 31, 41 and 51, respectively. At the points of symmetry of the openings 31, 41 and 51 to the center of the circular disks 30, 40 and 50, there are provided sectoral openings of different sizes 32, 42 and 52, respectively. The regions between the openings 31, 41 and 51 and the sectoral openings 32, 42 and 52 are of sufficient width to cover the holes 31, 41 and 51. The openings 32, 42 and 52 are fan shaped of same height, the degree of the opening angles varying up to ten times the smaller value. The openings 32, 42 and 52 are provided with filters; the optical densities of the filters vary up to ten times the smaller value and subsequently, the amounts of the transmitted lights at the openings 32, 42 and 52 are identical. The shutters are equipped with three protruding portions 33,34,35;43,44,45; and 53,54 and 55; respectively. The axes of rotation 36, 46 and 56 are in cylindrical form having different diameters, respectively and are rotatable around the center axis 70 which is fixed to the apparatus as shown in FIG. 7. Bearings and the like are preferably inserted between the axes of rotation 36, 46 and 56 and between the center axis 70 and axis of rotation 56 to make the frictional resistance as little as possible. The axes of rotation 36, 46 and 56 are of different heights and have gears 71, 72 and 73 of same diameters fixed thereto.

The gears selectively engage the intermediate gear 75 which is movable along the axis of motor 68.

Motor 68 which drives the shutters is controlled by the circuit shown in FIG. 8. Parallel circuits of microswitches 61, 62 and 63 and manually operated switch 67 are connected in series to the motor 68. The three microswitches 61, 62 and 63 are arranged near the circular disks 30, 40 and 50, respectively, and levers 64, 65 and 66 contact and circular disks as shown in FIG. 6. The solid line indicates an OFF state and the dotted line indicates an ON state of the microswitches. The power source is indicated by numeral 69.

The three shutters 30, 40 and 50 are placed at first in a rest position whereby the openings 31, 41 and 51 coincide with each other in the optical system of printing which contains condenser lens 6. FIG. 7 shows such state. In this state, the light from the light source for printing passes through the holes 31, 41 and 51 and strikes the surface 77 of loading a photographic paper and allows to make trimming and focus controlling.

Then, a shutter which permits to achieve the desired gradation such as the shutter shown in FIG. 4, is selected and the intermediate gear 75 is moved to make engagement with the gear 72 which is fixed to this shutter. When the manually operated switch 67 is pushed, motor 68 is rotated to cause rotation of the gear 72. In this manner, the shutter of FIG. 4 is rotated clockwise. The lever 65 of the microswitch 62 touches around the circle of the circular disk 40 and when comes to ride on the protruding part 45, the microswitch opens to cause the motor rotation to stop. In this case, a region without hole 41 and opening 42 of the circular disk of shutter 40 is inserted into the optical system of printing. Thus, holes 31 and 51 of the shutters shown in FIG. 3 and FIG. 5 coincide with the optical system of printing, but the shutter shown in FIG. 4 prevents the light reaching the surface 77 from loading a photographic paper from the light source for printing. At this stage, a photographic paper is placed on the surface 77. The manually operated switch 67 is pushed again and the motor is rotated to make the circular disk 40 rotate clockwise. Since the lever 65 contacts around the circular disk, when it is out from the protruding part 45, the microswitch comes to a state ON and the circular disk continues the rotation until the lever 65 rides on the next protruding part 43. When the opening 42 passes the optical system of printing, an exposure of light is carried out on the photographic paper, since circular disks 30 and 50 are in rest state and the holes coincide with the optical system of printing. The exposure time is determined on the basis of the degree of angle of the opening 42, because the rotating speed of motor 68 is constant. When lever 65 rides on the protruding part 43, microswitch 62 comes to a state OFF and the shutter ceases rotation. In this state, circular disk 40 prevents the optical system of printing and permits to remove the photographic paper after exposure from the surface 77 and to perform the further operation. When the manually operated switch 67 is pushed once more, the shutter rotates until the lever 65 rides upon the protruding part 44. Then the three shutters come to rest in a state in which holes 31, 41' and 51 coincide with each other, and they return to the initial position.

In the case when another gradation is desired, i.e., a harder tone printing image is desired, the shutter shown in FIG. 5 is suitably selected and when a softer tone image is desired, the shutter shown in FIG. 3 is selected. Both shutters can be employed and in both cases the amount of the transmitted light is equal and control of the amount of the exposure light can be attained by means of the exposure control iris 9 shown in FIG. 2. The openings of the shutters indicated in FIGS. 3, 4 and 5 give the exposure times of light such as 0.01, 0.1 and 1 second, respectively.

In the above explanation, trimming and focus controlling operations are carried out on the surface 77 of loading a photographic paper. It is also possible alternatively that a movable reflecting mirror 76 is provided as is shown in FIG. 7 and by means of the reflecting light, the trimming and focus controlling operations can be carried out observing another focus surface such as the image projected on the transmittance screen 78. After preventing the optical system of printing by the shutter capable of attaining the desired gradation, the reflecting mirror 76 is removed. The shutters may not be limited to three, but may be two or four or more.

I claim:

1. An apparatus for producing a photographic image and for producing the desired gradation from one kind of printing paper comprising a high intensity light source capable of producing a latent image on sensitized printing paper by an exposure of 0.01 second to 1 second, an electric power source for adjusting and effective light-up time of the light source connected thereto, means for varying the intensity of the light, in inverse proportion to the exposure time, at least one shutter for varying the exposure time between 1 second and 0.01 second and means for controlling the intensity of the light to adjust the density of the image produced and for varying the exposure time inversely proportionally to the light intensity, a lens and a light sensitive material containing silver halide.

2. The apparatus according to claim 1 wherein the means for controlling the intensity of the light in inverse proportion to the exposure time comprises a wedge-shaped member.

3. The apparatus according to claim 1 wherein the light source is a high pressure mercury lamp.

4. The apparatus according to claim 2, wherein the means for controlling the exposure time and the intensity of light comprise a gradation selector connected to said wedge-shaped member.

5. The apparatus according to claim 1, wherein a printing intensity control iris is provided in alignment with said shutter for controlling the total amount of the light in an exposure.

6. The apparatus according to claim 1 which comprises at least two shutters.

7. The apparatus according to claim 6 wherein said shutters are disks provided with apertures, the size of the apertures being different, and said shutters are provided with filters of different density in said apertures, whereby the amount of transmitted light through said apertures is equal.

8. The apparatus according to claim 7 which comprises means for rotating said disks around an axis of rotation at equal speed.

* * * * *

UNITED STATES PATENT OFFICE
CERTIFICATE OF CORRECTION

Patent No. 3854816                 Dated December 17, 1974

Inventor(s) Fujimura, Ikuo

It is certified that error appears in the above-identified patent and that said Letters Patent are hereby corrected as shown below:

Foreign application priority data:

April 8, 1964, Japan 19471/64.

This application is a continuation-in-part of Serial No. 128,487, filed March 26, 1971, which was a Divisional of Serial No. 887,281, filed December 22, 1969. Serial No. 887,281 was a Continuation-in-part of Serial No. 446,032, filed April 6, 1965.

Signed and sealed this 1st day of April 1975.

(SEAL)
Attest:

RUTH C. MASON              C. MARSHALL DANN
Attesting Officer           Commissioner of Patents
                                       and Trademarks